No. 683,348. Patented Sept. 24, 1901.
W. M. SMITH.
ADJUSTABLE SWINGING GATE.
(Application filed Oct. 13, 1900.)

(No Model.)

WITNESSES:
W. H. Harrison
J. E. Cregps.

INVENTOR.
Wm. M. Smith
BY Richard H. Harrison
His ATTORNEY.

UNITED STATES PATENT OFFICE.

WILLIAM M. SMITH, OF NEW CUMBERLAND, WEST VIRGINIA, ASSIGNOR OF ONE-HALF TO GEORGE A. McCANDLESS, OF OAKDALE, PENNSYLVANIA.

ADJUSTABLE SWINGING GATE.

SPECIFICATION forming part of Letters Patent No. 683,348, dated September 24, 1901.

Application filed October 13, 1900. Serial No. 32,920. (No model.)

*To all whom it may concern:*

Be it known that I, WILLIAM M. SMITH, a citizen of the United States of America, residing at New Cumberland, in the county of Hancock and State of West Virginia, have invented certain new and useful Improvements in Adjustable Swinging Gates; and I do hereby declare the following to be a full, clear, and exact description thereof, reference being had to the accompanying drawings, which form a part of this specification.

This invention relates to certain new and useful improvements in fence-gates.

The object of my invention is to provide a swinging gate which may be adjusted from a horizontal position to an angular position to suit inequalities or inclinations of the ground-surface and rigidly secure the same in said position.

With the above object in view the invention consists in the novel construction of gate as herein illustrated, in which—

Figure 1:
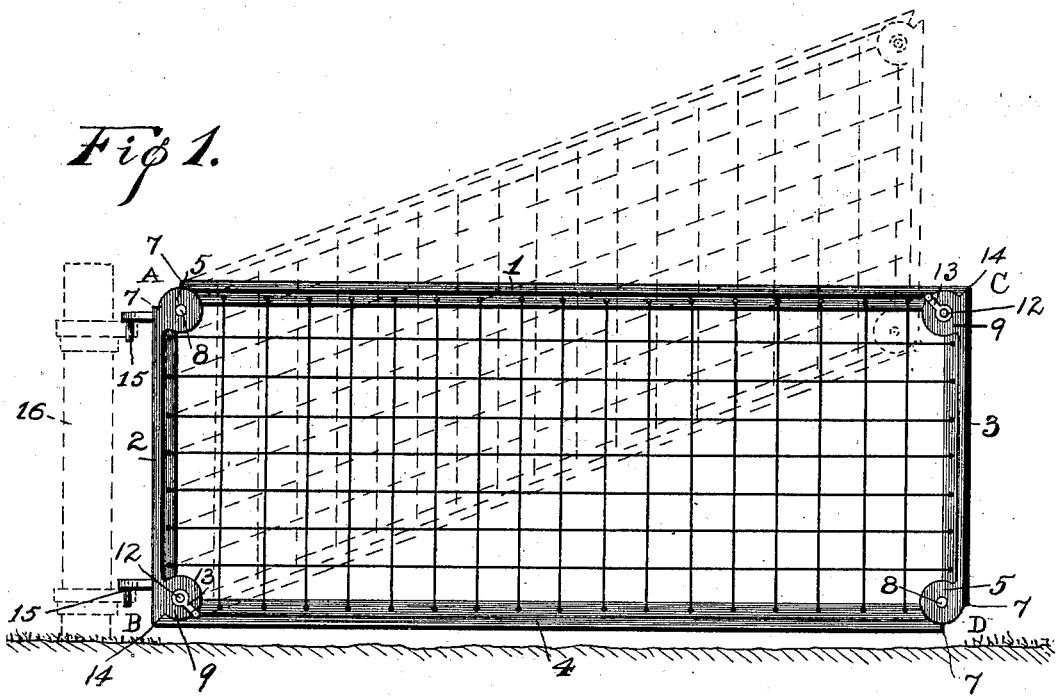
Figure 2:
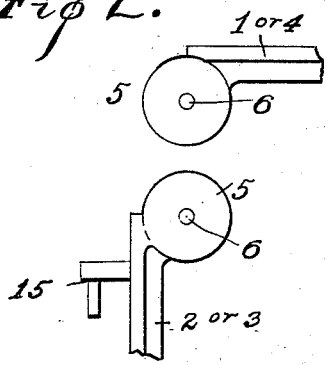
Figure 4:
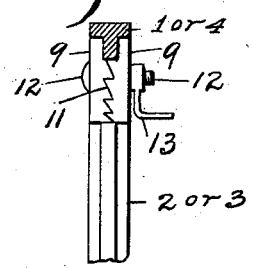
Figure 3:
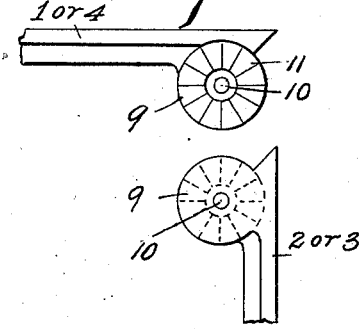
Figure 5:
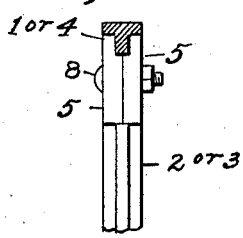

Figure 1 is a side elevation of my improved gate. Fig. 2 is an enlarged side elevation of a portion of the gate members disconnected to more fully show the construction of the hinged connections. Fig. 3 is an enlarged side elevation of a portion of the gate members disconnected to more fully show the construction of the locking connections. Fig. 4 is an enlarged end sectional view through the gate, showing the members locked. Fig. 5 is an enlarged end sectional view through the gate, showing the other hinged connections in position.

The gate is constructed of the four members 1, 2, 3, and 4, preferably of T shape in cross-section and hingedly connected together at the corners A, B, C, and D. The connecting ends of the members at A and D have each formed thereon a circular flange 5, having an opening 6 in the center thereof. These circular flanges project beyond the ends 7 of the members, so that when connected by a bolt 8 adjustment of the gate members may be made when desired. The connecting ends of the members at B and C have formed thereon the circular flanges 9, having openings 10 at their center. The inner connecting faces of these flanges are provided with teeth 11 to interlock with one another and form a rigid connection when drawn or secured together by the bolt 12 and crank-nut 13.

The meeting ends of the gate members at 14 are formed at an angle of forty-five degrees with the center of the circular flanges to prevent the gate being lowered to a point beyond a horizontal position.

The gate is provided at its rear member with the L-shaped connectors or hinge-pins 15, by which the gate is pivotally suspended from a suitable post 16.

To adjust the gate, as indicated by dotted lines at Fig. 1, to suit an elevation in the ground-surface, it is only necessary to release the crank-nuts 13 on the locking connections and adjust the gate to the desired inclination. After this has been accomplished and and the teeth register with one another the crank-nuts are again tightly adjusted, thereby rigidly securing the gate in position.

Having thus fully shown and described my invention, what I claim as new, and desire to secure by Letters Patent, is—

A swinging gate, comprising a frame of four members hingedly connected at its four corners to permit the same being adjusted from a horizontal to an inclined position, and means of locking the same in said position, said locking means consisting of radial teeth formed upon the engaging surfaces of two of said hinge connections which are adapted to register or interlock with one another, as set forth.

In testimony whereof I have hereunto affixed my signature in the presence of two subscribing witnesses.

WILLIAM M. SMITH.

Witnesses:
RICHARD S. HARRISON,
JAS. J. MCAFEE.